United States Patent [19]

Kerr et al.

[11] Patent Number: 5,476,522

[45] Date of Patent: Dec. 19, 1995

[54] METHOD FOR DEWATERING COAL TAILINGS USING DADMAC/VINYL TRIALKOXYSILANE COPOLYMERS AS A COAGULANT

[75] Inventors: E. Michael Kerr, Aurora; Manian Ramesh, Lisle, both of Ill.

[73] Assignee: Nalco Chemical Company, Naperville, Ill.

[21] Appl. No.: 401,640

[22] Filed: Mar. 8, 1995

[51] Int. Cl.⁶ .................................. C10L 9/10; C02F 1/56
[52] U.S. Cl. ................................. 44/626; 44/620; 210/734
[58] Field of Search ........................... 44/620, 621, 626; 210/734

[56] References Cited

U.S. PATENT DOCUMENTS

| | | | |
|---|---|---|---|
| 3,624,019 | 11/1971 | Anderson et al. | 210/734 |
| 4,151,202 | 4/1979 | Hunter et al. | 524/351 |
| 4,801,388 | 1/1989 | Fong et al. | 210/701 |
| 4,929,655 | 5/1990 | Takeda et al. | 524/458 |
| 5,006,590 | 4/1991 | Takeda et al. | 524/458 |
| 5,120,797 | 6/1992 | Fong et al. | 525/329.4 |
| 5,296,006 | 3/1994 | Reed et al. | 44/621 |
| 5,330,546 | 7/1994 | Ramesh et al. | 44/620 |

Primary Examiner—Prince Willis, Jr.
Assistant Examiner—James M. Silbermann
Attorney, Agent, or Firm—Robert A. Miller; James J. Drake; Patricia A. Charlier

[57] ABSTRACT

A method for concentrating coal tailings and for dewatering coal products employing a copolymer of diallyldimethylammonium halide and a vinyl alkoxysilane, preferably a copolymer of diallyldimethylammonium chloride and vinyltrimethoxysilane as a coagulant. The method for concentrating coal tailings comprises steps of: feeding the coal tailings to a thickener; treating the coal tailings with the coagulant, discharging substantially concentrated tailing; and withdrawing substantially clarified liquid from the thickener. A method for dewatering coal products containing water comprising the steps of: feeding the clean coal containing water to a twin belt filter press; treating said coal with an effective amount of a copolymer coagulant of diallyldimethylammonium halide and vinyl alkoxysilane, preferably diallyldimethylammonium chloride and vinyl trimethoxysilane is also disclosed. The method encompasses removing water from the coal product through the addition of the subject polymer coagulant; removing the dewatered clean coal product from the filter; and withdrawing the recycled water through the filter.

21 Claims, No Drawings 5,476,522

METHOD FOR DEWATERING COAL TAILINGS USING DADMAC/VINYL TRIALKOXYSILANE COPOLYMERS AS A COAGULANT

FIELD OF THE INVENTION

The present invention relates generally to the use of novel hydrophobically associating polyelectrolyte compositions as coagulants for coal tailings thickening, concentrating, and for dewatering clean coal products. These polyelectrolyte compositions are hydrophobically associating copolymers of diallyldimethylammonium halides, and particularly diallyldimethylammonium chloride (DADMAC) and vinyl alkoxysilanes, preferably, vinyl trimethoxysilane (VTMS).

BACKGROUND OF THE INVENTION

Coal is the most abundant natural energy source in the word. A significant portion of the U.S. domestic energy requirements are met by burning coal as a fossil fuel. There are various types of coal found within the U.S., i.e., anthracite, semi-anthracite, low-volatile bituminous coal, medium and high volatile bituminous coal, sub-bituminous coal, and lignite. Coals such as anthracite and semi-anthracite typically have high ash and sulfur contents and therefore require beneficiation prior to use.

The primary purpose of coal beneficiation is to reduce the incombustible ash content thus enhancing the heat content. Reduction in the ash content results in savings in transportation and ash disposal costs. Sulfur, mainly in the form of purite, is also reduced.

Another important economic factor to be considered in coal processing is the recovery and reuse of process water. Water is typically very expensive and there are often limits on total usage. Also, strict environmental controls prohibit or severely limit discharge of process water. Thus, it is imperative that solids be efficiently removed from the process water and water recycled to the process stream.

Beneficiation of coal is effected using two primary properties of coal, i.e., (1) differences in specific gravity between coal and its impurities, and (2) differences in surface characteristics between coal and its impurities. Since the higher ash content fractions are usually found in the finer coal sizes, some plants only screen out these sizes to beneficiate the coal. However, since the quality of such fine coal is on the rise, even this is treated.

A coal beneficiation plant may be broadly categorized into specific gravity separation and fine coal treatment. In gravity separation, cleaning units make use of the differences in specific gravity between coal and its impurities to effect separation. Normally, the specific gravity of the clean coal is less than its impurities. Some commonly used equipment for gravity separation are: jigs, heavy medium baths and cyclones, washing tables, water only cyclones and spirals.

Fine coal treatment incorporates a flotation cell(s), clean coal filter and thickener. In the flotation cell, a collector and frother are added to the flotation feed. A collector such as diesel oil selectively imparts hydrophobicity to the coal particles. This increased hydrophobicity makes the air bubbles more likely to attach to the coal particles. The frother generally an alcohol based product reduces the surface tension of the air/water interface, thus making a stable froth.

The clean coal concentrate from the flotation cells goes to the clean coal filter and is dewatered. The tailings from the flotation cell go to the thickener where they are thickened and discharged.

The thickener is treated with coagulants and flocculants to enhance settling. Typically, the coagulants and flocculants are added at several points along the feed line to the thickener and in different sequences. Coagulation is the destabilization by surface charge neutralization of stable negatively charged particles that are in suspension (i.e., settleable or dispersed) through the utilization of inorganic salts or cationic polyelectrolytes. Flocculation is the aggregation of finely divided particles which are suspended in a liquid through the utilization of an entrapping agent, generally an inorganic flocculant, or a bonding agent, generally an organic flocculant, that brings the particles together.

Although some inorganics, principally alum and iron salts, are still used as coagulants, water soluble organic polymers are more commonly used as coagulants. Both naturally occurring and synthetic polymers find use as coagulants and flocculants in the mining industry. The principal natural polymers used are starch and guar, both of which are high-molecular weight polymers of simple sugars, such as polysaccharides. Starch is a polymer of glucose consisting of a mixture of linear (amylose) and branched segments (amylopectin).

Synthetic polymers have the advantage that they can be tailored to a specific application. This has resulted in a wide range of commercially available coagulants and flocculants of varying charge, composition, and molecular weight. The most widely used synthetic coagulants are polydiallyldimethylammonium chloride (polyDADMAC) having molecular weights in the range of from 100,000 to as high as 1,000,000 or higher and condensation polymers of dimethylamine and epichlorohydrin (Epi/DMA) which generally have molecular weights in the range of 20,000 to 100,000.

The present inventors have developed various novel hydrophobically modified polyelectrolyte copolymers which may be used as coagulants in both the thickening process and the clean coal product dewatering process during coal beneficiation. These cationlenity charged hydrophobicaly modified polymers which incorporate into the polymer backbone a vinyl alkoxysilane exhibit improved performance or activity in coal tailings thickening than do conventional inorganic and organic coagulants. This unique cationic and surface active polymers of this invention are advantageous over conventional polymers because they are capable of both increased surface activity, as evidenced by the lowering of surface tension, and adsorption onto hydrophobic surfaces. The advantages of the diallyldimethylammonium chloride/vinyl trialkoxysilane copolymers stem from the fact that they have the following characteristics: 1) silicon components are capable of forming networks with other silicon monomers similar to crosslinking; and 2) silicon moieties are capable of adhering or adsorbing to hydrophobic surfaces. The hydrophobically associating copolymers of the instant invention demonstrate enhanced performance with replacement ratios on the order of 0.3 5–0.50 over current commercially available poly (DADMAC) treatments.

The present invention also provides many additional advantages which shall become apparent as described below.

SUMMARY OF THE INVENTION

This invention is directed to a method for concentrating coal tailings which include liquid and colloidal particles, and a method for dewatering clean coal products using copolymers of diallyldimethylammonium halides and vinylalkoxysilanes. Preferred polymers are made from diallyldimethylammonium chloride and vinyltrimethoxysilane. The method of the invention comprises the steps of: feeding the coal tailings to a thickener; treating the coal tailings with the copolymer of the invention, a diallyldimethylammonium chloride (DADMAC) and vinyl alkoxysilane copolymer. The preferred vinyl trialkoxysilane is vinyl trimethoxysilane. The coagulant is added to the coal tailings, whereby the charges on the surfaces of the colloidal particles are reduced or neutralized; treating the coal tailings with a flocculant in an amount between about 0.05 to about 0.25 lb/ton, whereby the colloidal particles agglomerate and settle out as concentrated tailings; discharging substantially concentrated tailing; and withdrawing substantially clarified liquid from the thickener.

While this specification is particularly directed to exemplifying the use of the polydiallyldimethylammonium chloride/vinyltrialkoxy silane polymers of the invention in the coagulation of coal tailings, and in the preparation of clean coal, the polymers may also find application in the processing of other minerals, including but not limited to kaolin, alumina, sands and gravel, precious metals, copper, and taconite.

The method for dewatering coal products containing water comprising the steps of: feeding the clean coal containing water to a mechanical filtering device, especially a twin belt filter press; treating said coal with an effective amount of a copolymer of diallyldimethylammonium halide monomer and a vinyl alkoxysilane whereby water is removed; removing the dewatered clean coal product from the filter; and withdrawing the recycled water through the filter. The preferred copolymer for use in the practice of dewatering coal products in accordance with this invention is a copolymer of diallyldimethylammonium chloride and vinyltrimethoxysilane.

Other and further objects, advantages and features of the present invention will be understood by reference to the following specification.

DESCRIPTION OF THE INVENTION

The present inventors have developed a new class of coagulants which exhibit enhanced performance in coal refuse and/or tailings thickening. These coagulants are copolymers of DADMAC and trialkoxysilanes. Such hydrophobically associating copolymers have an enhanced performance with replacement ratios on the order of about 0.35 to about 0.50 over commercially available poly(DADMAC) treatments.

In the beneficiation of fine coal, a collector and a frother are added to a flotation feed. The concentrate, i.e., clean coal, from the flotation cells goes to the clean coal filter and is dewatered. The tailings or refuse from the flotation cells go to the thickener where they are thickened and discharged.

The tailings or refuse are preferably treated with coagulants and flocculants. It has been discovered that surface charge neutralization of colloidal particles in the tailings suspension can be enhanced by the use of a copolymer which has been modified to incorporate a certain degree of hydrophobic characteristics. Such a modification can be accomplished by copolymerizing a diallyldimethylammonium halide, particularly diallyldimethylammonium chloride (DADMAC) with vinyl alkoxysilane, preferably vinyl trimethoxysilane.

The vinyl alkoxysilane monomers useful in the copolymer composition of the invention contain an alkyl group of from 1–4 carbon atoms. As such vinyl trimethoxy, triethoxy, tripropoxy and tributoxysilanes, and combinations thereof, may find use in the subject invention. While vinyl trialkoxysilanes are preferred, the monomers may be mono or di-substituted as well, or mixtures of mono-, di- and trialkoxy substituted silanes may be used. A preferred vinyl trialkoxysilane for use in this invention is vinyl trimethoxysilane. Vinyl trimethoxysilane is commercially available from the Dow Corning Corporation, Midland, Mich., and from Hüls America, Philadelphia, Pa.

Diallyldimethylammonium halides, especially diallyldimethylammonium chloride are well-known and commercially available from a variety of sources. One method for the preparation of DADMAC is detailed in U.S. Pat. No. 4,151,202, the disclosure of which is hereinafter incorporated by reference into this specification.

The mole ratio of DADMAC to the vinyl trialkoxysilane ranges from 99.99:01 to 80:20 and, preferably from 99.9:0.1 to 85:15. Most preferably, the mole ratio of DADMAC to the vinyl trialkoxysilane range from 99.9:0.1 to 95.0:5.0.

The polymers may be prepared as in convention vinyl polymerization techniques. These techniques include convention solution polymerization in water, and polymerization in water-in-oil emulsion form, such as that described in U.S. Pat. No. 3,624,019, the disclosure of which is hereinafter incorporated by reference into this specification. The polymers of the invention may also be prepared in so-called dispersion form, such as that described in U.S. Pat. Nos. 4,929,655 and 5,006,590 the disclosures of which is also hereinafter incorporated by reference into this specification.

Conventional free radical catalysis may be used including both free radical initiators and red-ox systems. Such polymerizations are within the skill of those skilled in the art and as such will not be elaborated on in this specification.

The molecular weights of the copolymer prepared hereunder can vary greatly. Generally, copolymers of diallyldimethylammonium chloride and vinyl trimethoxysilane produced hereunder will have a molecular weight of from 50,000 to 5,000,000, and preferably 75,000 to 2,500,000, and most preferably from 50,000 to 1,000,000. The polymers of this invention will accordingly have a reduced specific viscosity for a one percent by weight polymer solution as measured in one molar sodium nitrate of from 0.2–5 dl/gm and preferably f from 0.5–4.0 dl/gm. A most preferred reduced specific viscosity range is from 0.7–3.0 dl/gm. While discussed herein as copolymers of diallyldimethylammonium halides and vinyl alkoxysilanes, other monomers may be incorporated into the resultant polymers without detracting from the spirit and intent of the invention. Possible monomers that may be incorporated include, but are not limited to nonionic and cationic vinyl monomers. These materials are exemplified by acrylamide, and such cationic monomers as dimethylaminoethylmethacrylate and dimethylaminoethyl acrylate and their respective water soluble quaternary amine salts.

The copolymers of this invention may be used alone, or in combination with a high molecular weight anionic or non-ionic water soluble or dispersible flocculant. Such polymers include polyacrylamide, and copolymers of acrylamide with acrylic acid and its water soluble alkali metal or ammonium salts. As used herein, the term acrylic acid is meant to encompass such water soluble salts. Also useful are such polymers as sulfomethylated acrylamides as exemplified in U.S. Pat. Nos. 5,120,797 and 4,801,388, the disclosures of which are hereinafter incorporated by reference into this specification. Other commercially available anionic flocculant materials may also be utilized.

A preferred class of flocculants for use in this invention includes copolymers of acrylamide and acrylic acid having a mole ratio of acrylamide to acrylic acid of from 99:1 to 1:99 and preferably 99:1 to 50:50. Most preferably, the mole ratio of acrylamide to acrylic acid will be 95:5 to 60:40. An especially preferred flocculant for use in this invention has a mole ratio of acrylamide to acrylic acid of about 70:30

The flocculants of this invention may be prepared in solution form, or in water-in-oil emulsion form. The preparation of such flocculants is known to those skilled in the art. The flocculants generally have molecular weights ranging from as low as 1,000,000 to 20,000,000 or higher. Preferred flocculants have a molecular weight of about 10,000,000. The upper weight of molecular weight is not critical so long as the polymer is water soluble or dispersible.

The flocculant is believed to cause the aggregation of the neutralized colloidal particles which are suspended in the tailings suspension. Aggregation is the result of either entrapping agents (i.e., inorganic flocculants) or bonding agents (i.e., organic flocculants) bringing the neutralized particles together.

The coagulants and flocculants can be added at several points along the feed line to the thickener and in different sequences. A typical thickener is a gravity sedimentation unit which is a cylindrical continuous thickener with mechanical sludge raking arms. The tailings (i.e., a solids/liquid dispersion) enters the thickener at the centerwell. The coagulants and/or flocculants are added at points in the feed line and/or centerwell. The number of addition points, sequence, flocculant, coagulant, etc. are determined by laboratory cylinder tests for each particular application. The flocculated solids settle to the bottom of the thickener. The mechanical arms rake the sludge and it is discharged. The clarified water overflows into a launder surrounding the upper part of the thickener.

The copolymer of diallyldimethylammonium chloride and vinyl trialkoxysilane is generally added to the thickener or mechanical filter device at a rate of about 0.01 to about 0.3 lb/ton of flotation tailings or clean coal, and preferably 0.075 to about 0.25 lb/ton. Most preferably from about 0.1 to 0.25 lb of polymer is used per ton of tailings or clean coal. The amount of coagulant will vary according to the particular refuse stream to be clarified or clean coal to be dewatered. Flocculant may also be added to the thickener in an effective amount generally between about 0.01 to about 0.25 lb/ton of flotation tailings.

After treatment of the flotation tailings with sufficient coagulant and optionally flocculant, the thickener underflow or refuse (i.e., concentrated tailings) are removed from the bottom of the thickener, while water and/or other liquids are taken out overhead. The water can thereafter be recycled as process water for use in the beneficiation process or disposed of in pubic waterways. The concentrated tailings or refuse from the thickener can be thereafter disposed of, generally as landfill.

In most instances, adding a given amount of flocculant in two or more increments results in better performance than adding the same amount of flocculant in one increment. It is not unusual to be able to reduce the amount of flocculant required by as much as 30–40% by multi-point addition and still achieve the required settling rate. Multi-point addition may also provide improved clarity (i.e., lower suspended solids) at a given settling rate.

This practice is implemented in a beneficiation plant process by adding the flocculant at different points in the feed line to the thickener. The improvement results from reducing the amount of surface area that the second or third portion of flocculant actually contacts when added to the system.

However, many solid/liquid dispersions are heterogeneous. For example, a simple coal wash water that has to be cleaned up prior to re-use is generally a mixture of coal, clay, and water. In this system, the clay tends to have a cationic demand and coal has (for all practical purposes) no cationic demand. Coal will, however, adsorb the coagulant. The treatment sequence begins with the addition of a flocculant which visibly agglomerates the coal with little or no impact on the clay. Next, addition of a coagulant will coagulate the clay. Finally, more flocculant is added to "tie up" the flocs of coal and clay. By beginning the treatment sequence with flocculant, the coal is flocculated and its surface area is reduced. Less coagulant is required to satisfy the coagulant demand of the clay because less is diverted to the coal. Using this addition sequence can often reduce the coagulant requirements by 50% or more.

The present invention can best be understood by reference to the following working and comparative examples.

EXAMPLE 1

A 90:10 mile copolymer of diallyldimethylammonium chloride (DADMAC) and vinyl trimethoxysilane (VTMS), at 20% actives, was prepared for use as a coagulant in coal beneficiation process. The following reactants were used to form the hydrophobically polyelectrolyte associating copolymer coagulant:

| | |
|---|---|
| 312.91 grams | Diallydimethylammonium Chloride DADMAC (a 58% Solution) |
| 18.89 grams | Vinyl Trimethoxysilane (a 98% Solution) |
| 200.0 grams | Deionized Water |
| 1.80 grams | Vazo 50 Initiator [2,2$^1$-Azobis (2-amidinopropane)] Dihydrochloride |
| 20.0 grams | Sodium Chloride |
| 446.20 | Final Solution Water |

A semi-batch process was used to prepare DADMAC/VTMS copolymer.

A 1.5L reactor equipped with a mechanical stirrer a thermo couple, nitrogen inlet/outlet tubes, condenser and two syringe pumps was set up. Vinyl trimethoxysilane was taken in the first pump set at a delivery rate of 4.5 cc/hr. In the second pump, an aqueous solution of Vazo 50 [2,2$^1$azo-bis (2-amidinopropane)dihydrochloride] (1.2 g in 48.8 g DI water) was taken and the pump was set at 12.5 scc/hr.

The DADMAC, sodium chloride, versene were charged into a polymerization reactor and heated to 52° C. The reaction mixture was purged with nitrogen. VTMS and V-50 pumps were started and the polymerization was allowed to proceed.

A thick polymer started forming after about 2 hours. At the end of two and a half hours, the viscosity increased to a point where continued agitation was difficult. 200 ml of deionized water was then added. The reaction continued for a period of 5 hours, and then subjected to a post treatment at 82° C. for 5 hours.

Product phase separated in two days and indicated extensive crosslinking as shown below:

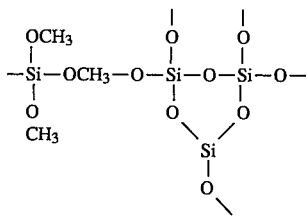

The phase separated product was insoluble in water and only swelled in water.

EXAMPLE 2

A 99.5/0.5 mole copolymer of diallyldimethylammonium chloride (DADMAC) and vinyl trimethoxysilane (VTMS), at 20% actives, was prepared for use as a coal benefication agent. The following reactants were used to form the hydrophobic polyelectrolyte copolymer coagulant:

| | |
|---|---|
| 321.13 grams | DADMAC (a 62% Solution) |
| 1.00 grams | VTMS (a 98% Solution) |
| 0.2 grams | Versene |
| 258.8 grams | Deionized Water |
| 1.20 grams | Vazo ® VA-044 Initiator (2,2'-Azobis [2(2-imdazolin-2yl)propane] dihydrochloride |
| 61.00 grams | Sodium Chloride |
| 356.87 grams | Dilution Water |

A batch process was used to prepare the DADMAC/VTMS copolymer. A reactor similar to the one described in Example 1 was used.

The DADMAC, VTMS, Versene sodium chloride and deionized water were charged into a polymerization reactor at a temperature of 58° C. Thereafter, the VA-044 (0.6 grams in 49.4 grams deionized water) was charged into the reactor dropwise via a syringe pump at 12.5 cc/hour.

A thick polymer started forming after about 1.0 hour. At the end of 1.5 hours, the mixture was difficult to stir. At this point, deionized water addition was started using a syringe pump set at 70 ml/hour. The reaction continued for a period of 5.5 hours. After that, VA-044 (0.6 grams in 19.4 grams of deionized water) was added. The reactor was heated to 82° C. and held at that temperature for 3 hours. The reaction product was then diluted with 356.87 grams of water and stored. Reduced specific viscosity and intrinsic viscosity measurements were determined on a 1% polymer solution in $NaNO_3$ (sodium nitrate) and found to be 2.02/1.3 dl/gm respectively.

EXAMPLE 3

A 99.0/1–0 mole % DADMAC/VTMS was prepared using the procedure of Example 2. 2.0 g of VTMS and 355.07 g of DI water were used in place of the amounts in Example II. All other quantities were the same. RSV/IV for a 1% by weight solution of the polymer in sodium nitrate were 2.2/1.2dl/g, respectively. This material is hereinafter referred to as Example 3.

EXAMPLE 4

The following experimental results were conducted at a commercial coal refuse facility. Coal refuse thickener coagulants were evaluated. The coagulant to be evaluated is added first at the indicated dosage, and then a 1% by weight solution of the flocculant which is a 1% solution of a 70/30 mole ratio of an acrylamide/acrylic acid copolymer is added at a rate of 15 gallons per minute to the coal refuse stream. Samples were taken from the production thickener, which was approximately twelve feet deep and fifty feet in diameter. Sampling occurred at a point of turbulence, from the center well of the thickener by submerging a one liter plastic graduated cylinder attached to an 8 to 15 foot long pole. The settling rate is then measured in inches per minute with a stopwatch, while observing the cylinder. In most refuse thickeners, the settling rate of 8–10 inches per minute is preferable. After three minutes settling, a twenty ml aliquot of supernatent was removed from the top of the graduated cylinder. Turbidity is then measured with an NTU turbidimeter. Normally, the preferred range is from 150–250 NTU, and the lower the NTU number, the greater the amount of flocculation has occurred.

The experimental data illustrates that commercial poly-(DADMAC) with an intrinsic viscosity of from 0.8 to 1.2 does not work as efficiently as the poly(DADMAC/VTMS) as prepared in Example 3 determined by lower NTU numbers obtained using Example 3. Furthermore, Table I below illustrates that to obtain a turbidity of 100 NTU units, where it is necessary to use a 400 ml/min dosage of poly(DADMAC), only 140 ml/min dosage of the polymer of Example 3 was required. The instant invention represents an increase in efficiency over commercially available coagulants. For comparison, the turbidity of the coal refuse within the thickener without coagulant and flocculant has been included in Table I. Without any treatment at all, turbidity is extremely high.

TABLE I

| Cationic Coagulant | Dose (gram active polymer/min.) | Average NTU |
|---|---|---|
| poly(DADMAC)[1] | 14 grams | 480 |
| poly(DADMAC)[1] | 30 grams | 380 |
| Example 3 | 44 grams | 287 |
| Blank | 0 | 1794 |
| poly(DADMAC)[1] | 80 | 100 |
| Example 3[2] | 28 | 100 |

[1]= commercially available solution polymer of polydiallyldimethylammonium chloride having approximately the same intrinsic viscosity or polymer of Example 3. Product is commercially available from Nalco Chemical Company, Naperville, Illinois.
[2]= different experimental run from first use of Example 3.

EXAMPLE 5

This experiment is a laboratory simulation of coal mining processing conditions. For the test, samples of polymers were evaluated in five gallon plastic buckets which had been modified with three plastic baffles added to the inside wall of each bucket at 120° intervals. These baffles were the height of lowest outside rim and were extended approximately three inches into the center of the bucket. The baffles were made of ¼ inch thick gray plastic stock. Agitation rates were varied by using a mixer under rheostatic control. The impeller used was a stainless steel plate. The experiment was conducted by first agitating 4½ gallons of fresh thickener feed slurry in the modified buckets. Next, 0.1 ml of the cationic polymer to be evaluated was injected into the agitated slurry. Alternatively, 0.01 grams of dry polymer was added where indicated. Samples were taken at 15, 30 and 60 second intervals in 500 ml graduated cylinders. After withdrawing the sample, 5 mls of an 0.05% anionic flocculant which consisted of a 73:30 mole ratio of an acrylamide acrylate acid copolymer was added to the cylinder. After inverting the cylinder several times, the settling rate could be measured. Turbidity as measured by NTU (nephelometric turbidity units) was determined after three minutes of settling time.

Lower turbidity numbers were obtained in the case of the polymer of Example 3 than for a solution polymer and (DADMAC triallyl amine). Since triallyl amine is known as a cross-linking agent, the results show that the effort of the vinyl trimethoxysilane is not merely to increase flocculation due to increased cross-linking of the resultant polymer. This is so because the (poly(DADMAC/triallyl amine)) copolymer which should have a high degree of crosslinking did not show significant improvement in flocculating capabilities.

TABLE II

| Polymers | Mole % | % Actives | o.g Active Polymer/min | 15 Seconds NTU | 40 Seconds NTU |
| --- | --- | --- | --- | --- | --- |
| poly(DADMAC)/TAA[1] | 99.95/0.05 | 20 | 0.04 | 92 | 143 |
|  |  |  | 0.08 | 45 | 77 |
| Example 3 | 99/1 | 20 | 0.02 | 64 | 87 |
|  |  |  | 0.04 | 60 | 72 |

[1] = TAA = triallyl amine

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A method for dewatering coal tailings containing water, said method comprising the steps of:
   a. feeding said coal tailings to a thickener;
   b. contacting said coal tailings with an effective amount of a coagulant which comprises a copolymer of diallyldimethylammonium halide and a vinyl alkoxysilane;
   c. allowing said coal tailings to settle to the bottom of the thickener to obtain concentrated coal tailings;
   d. discharging said concentrated tailings from said thickener; and,
   e. withdrawing clarified liquid from said thickener.

2. The method of claim 1 wherein the diallyldimethylammonium halide is diallyldimethylammonium chloride and the vinyl alkoxysilane is vinyl trimethoxysilane.

3. The method of claim 2 wherein the coagulant has a reduced specific viscosity in one molar sodium nitrate solution for one percent polymer actives of from 0.2 to 5 dl/gm.

4. The method of claim 2 wherein the coagulant has a reduced specific viscosity in one molar sodium nitrate solution for one percent polymer actives of from 0.5 to 4.0 dl/gm.

5. The method of claim 2 wherein the coagulant has a reduced specific viscosity in one molar sodium nitrate solution for one percent polymer actives of from 0.7 to 3.0 dl/gm.

6. The method of claim 2 wherein the mole ratio of diallyldimethyl ammonium chloride to vinyl trimethoxysilane ranges from 99.99:0.01 to 80:20.

7. The method of claim 2 wherein the mole ratio of diallyldimethylammonium chloride to vinyl trimethoxysilane ranges from 99.9:0.1 to 85:15.

8. The method of claim 2 wherein the mole ratio of diallyldimethylammonium chloride to vinyl trimethoxysilane ranges from 99.9:0.10 to 95.0:5.0.

9. The method according to claim 2 further comprising the addition of a flocculant prior to the addition of said coagulant to the coal tailings.

10. The method according to claim 9 wherein said flocculant is a copolymer of acrylamide and acrylic acid.

11. A method for dewatering a clean coal product containing water comprising the steps of:
   a. feeding a clean coal product containing water to a mechanical filtering device;
   b. contacting said clean coal product with an effective amount of a coagulant comprising a copolymer of diallyldimethylammonium chloride and a vinyl alkoxysilane;
   c. removing water from said clean coal product; and then,
   d. recovering a dewatered clean coal product from the mechanical filtering device.

12. The method of claim 11 wherein the coagulant is a copolymer of diallyldimethylammonium chloride and vinyl trimethoxysilane, and said copolymer has a reduced specific viscosity in one molar sodium nitrate solution for one percent polymer actives of from 0.2 to 5 dl/gm.

13. The method of claim 12 wherein the coagulant has a reduced specific viscosity in one molar sodium nitrate solution for one percent polymer actives of from 0.5 to 4.0 dl/gm.

14. The method of claim 12 wherein the coagulant has a reduced specific viscosity in one molar sodium nitrate solution for one percent polymer actives of from 0.7 to 3.0 dl/gm.

15. The method of claim 12 wherein the mole ratio of diallyldimethylammonium chloride to vinyl trimethoxysilane is from 99.99:0.01 to 80:20.

16. The method of claim 12 wherein the mole ratio of diallyldimethylammonium chloride to vinyl trimethoxysilane is from 99.9:0.1 to 85:15.

17. The method of claim 12 wherein the mole ratio of diallyldimethylammonium chloride to vinyl trimethoxysilane is from 99.9:0.1 to 95.0:5.0.

18. The method according to claim 12 further comprising the addition of a flocculant prior to the addition of said coagulant to said clean coal product containing water.

19. The method according to claim 18 wherein said flocculant is a copolymer of acrylamide and acrylic acid.

20. The method of claim 11 wherein the mechanical dewatering device is a twin belt filter press.

21. The method of claim 1 wherein the thickener is a gravity sedimentation device.

* * * * *

UNITED STATES PATENT AND TRADEMARK OFFICE
CERTIFICATE OF CORRECTION

PATENT NO. : 5,476,522
DATED      : December 19, 1995
INVENTOR(S): E. Michael Kerr & Manian Ramesh It is certified that error appears in the above-indentified patent and that said Letters Patent is hereby corrected as shown below:

Column 6, Line 31

A 90:10 mile copolymer of diallyldimethylammonium

LETTERS PATENT SHOULD READ AS:

A 90:10 mole copolymer of diallyldimethylammonium

Column 7, Line 5

LETTERS PATENT STRUCTURE SHOULD BE AS:

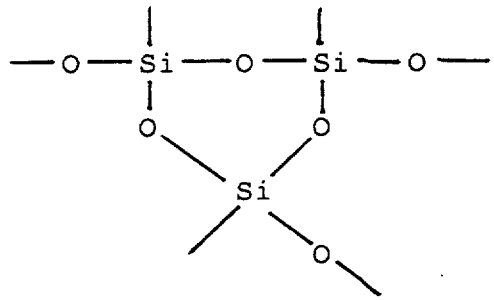

Signed and Sealed this

Nineteenth Day of March, 1996

*Attest:*

BRUCE LEHMAN

*Attesting Officer*   *Commissioner of Patents and Trademarks*